United States Patent
Kawamura et al.

(10) Patent No.: US 8,498,190 B2
(45) Date of Patent: Jul. 30, 2013

(54) OPTICAL HEAD USING BEAM DIVIDING ELEMENT

(75) Inventors: Tomoto Kawamura, Yokohama (JP); Hiroshi Ogasawara, Yokohama (JP); Kotaro Oishi, Fujisawa (JP); Yoshio Okamoto, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/396,835

(22) Filed: Feb. 15, 2012

(65) Prior Publication Data

US 2012/0218874 A1  Aug. 30, 2012

(30) Foreign Application Priority Data

Feb. 28, 2011 (JP) .................................. 2011-041097

(51) Int. Cl.
*G11B 7/00* (2006.01)
(52) U.S. Cl.
USPC .................................. 369/112.04; 369/44.23
(58) Field of Classification Search
None
See application file for complete search history.

(56) References Cited

U.S. PATENT DOCUMENTS

| 5,404,344 A * | 4/1995 | Imada et al. ............... 369/44.14 |
| 2010/0214902 A1* | 8/2010 | Nakano et al. ........... 369/112.03 |
| 2011/0063956 A1* | 3/2011 | Yamazaki ................. 369/44.11 |

FOREIGN PATENT DOCUMENTS

| JP | 4-119531 | 4/1992 |
| JP | 2006-139814 | 6/2006 |
| JP | 2010-272152 | 12/2010 |

* cited by examiner

*Primary Examiner* — Paul Huber
(74) *Attorney, Agent, or Firm* — Antonelli, Terry, Stout & Kraus, LLP.

(57) ABSTRACT

An optical head capable of recording or playing back optical discs is provided. The optical disc comprises a light source to emit a beam, an objective to focus the beam on an optical disc, a beam dividing element having a plurality of divided areas with which to divide a cross section of the beam reflected from the optical disc, and a light detector to receive the beams divided by the beam dividing element, wherein the beam dividing element has in at least one of the plurality of areas an aberration imparting function of imparting an astigmatism or defocus aberration to a beam passing through that area.

13 Claims, 9 Drawing Sheets

OPTICAL HEAD USING BEAM DIVIDING ELEMENT

INCORPORATION BY REFERENCE

The present application claims priority from Japanese application JP 2011-041097 filed on Feb. 28, 2011, the content of which is hereby incorporated by reference into this application.

BACKGROUND OF THE INVENTION

The present invention relates to an optical head capable of playing back or recording optical discs.

Among background arts in this technical field, there is JP-A-4-119531 (Patent Literature 1) which is described to offer an optical pickup capable of stable writing and playback by preventing an offset of a tracking error signal produced by the movement of an objective lens. The literature claims that this optical pickup detects the amount of offset and produces an offset-corrected tracking error signal.

SUMMARY OF THE INVENTION

There are standards for optical discs, such as BD's (Blue-ray Discs), DVD's (Digital Versatile Discs) and CDs (Compact Discs). An optical head when recording or playing back any of these optical discs emits a beam from a light source, focuses it on the optical disc by an objective, detects a beam reflected from the disc by an optical detector, and produces from the detected beam a playback signal of the disc, a track error signal for controlling a shift of a light spot on the disc from a guide groove (hereinafter referred to as a track) in the disc and a focus error signal for controlling a focusing shift of a light spot on the disc. Among techniques for generating the focus error signal there are known to be a knife edge method, an astigmatism method and a spot size method. In generating the track error signal, commonly used methods include a DPP (Differential Push Pull) method that emits a plurality of beams onto the optical disc, a DPD (Differential Phase Detection) method that throws a single beam onto the disc, and a 1-beam DPP method. The 1-beam DPP method consists in throwing one light beam onto the optical disc and dividing a reflected beam from the disc into a plurality of beams to remove the offset in a similar manner to that of the DPP method. Since there is only one light beam on the disc, the 1-beam DPP method can be said to have a higher light efficiency of the beam emitted from the light source onto the optical disc than the DPP method.

Patent Literature 1 describes an optical head that uses the 1-beam DPP method in generating the track error signal. Patent Literature 1, however, does not give any concrete description on the generation of the focus error signal. It is an object of this invention to provide a means that can realize an optical head of simple construction using a highly efficient 1-beam DPP method and capable of generating a focus error signal.

The above objective can be accomplished by, for example, a construction defined by the accompanying claims.

With this invention, an optical head with high light efficiency and low cost can be realized.

Other objects, features and advantages of the invention will become apparent from the following description of the embodiments of the invention taken in conjunction with the accompanying drawings.

DESCRIPTION OF THE EMBODIMENTS

Now, the embodiments of this invention will be explained in detail by referring to the accompanying drawings. It is noted, however, that these embodiments are not meant to impose any limitations on the invention.

[Embodiment 1]

Embodiment 1 of this invention is explained by referring to the drawings. Here an optical head with one light source is taken for example. The optical head of interest includes, for example, those capable of recording or playing back optical discs of DVD or BD standard.

Figure 1:
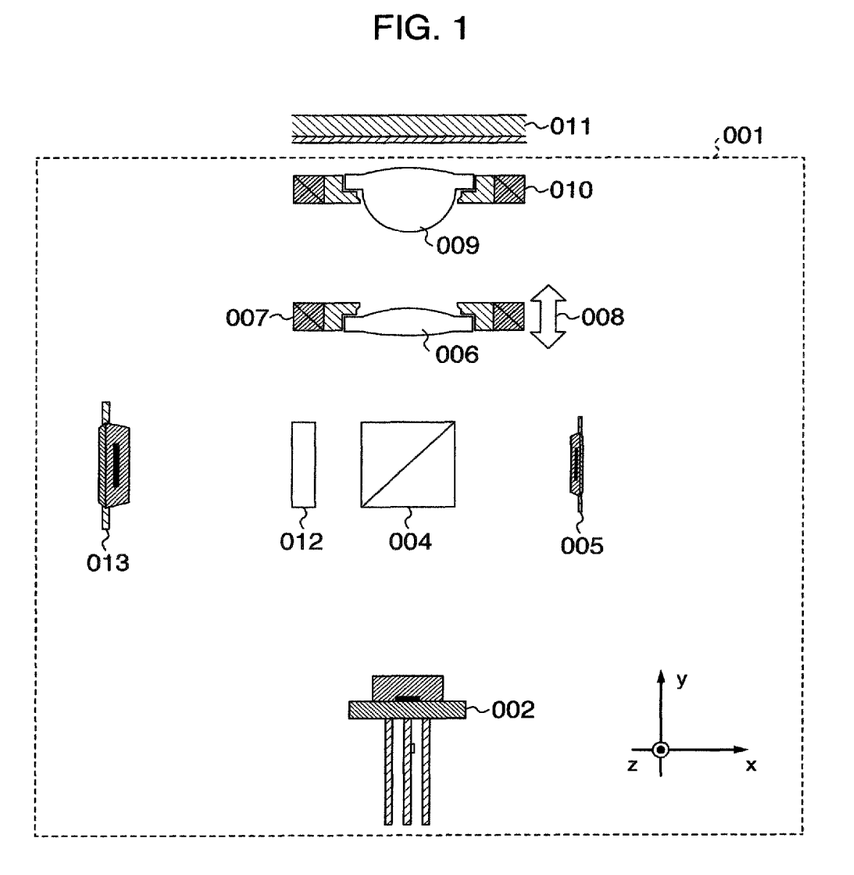
FIG. 1 schematically shows a construction of an optical head 001 in Embodiment 1.

FIG. 1 schematically shows a construction of an optical head 001 in Embodiment 1. A light beam is emitted from a light source 002 in the form of scattered rays of light in the direction of arrow y in the figure. In recording or playing back information in or from an optical disc, a semiconductor laser is generally used. The light source 002 represents the semiconductor laser that emits light of a predetermined wavelength.

The light beam emitted from the light source 002 enters a beam splitter 004. The beam splitter 004 is an optical element that allows a predetermined amount of the incident light to pass therethrough and reflects the remaining light, thereby splitting the beam in two. Such a function may be realized by, for example, a half prism or a polarizing prism.

The light beam that has passed through the beam splitter 004 enters a collimator lens 006 with the remaining, reflected beams proceeding to a front monitor 005.

The beam entering the collimator lens 006 is collimated into an almost parallel beam. On an information layer of optical discs there is a protective layer to prevent dust or finger prints to be formed on it. This protective layer has variations in thickness, or thickness errors, which may cause spherical aberrations resulting in playback signals being degraded. In optical heads it is common practice to use a method of driving the collimator lens in the direction of an optical axis to correct the spherical aberrations. For this reason, it is desired that the collimator lens 006 be provided with a spherical aberration correction structure 007 that allows it to be moved in the optical axis direction. The spherical aberration correction can also be accomplished by concentric circular liquid crystal elements. Thus, instead of adopting the mechanism to move the collimator lens 006, it is also possible to arrange the liquid crystal elements near the collimator lens 006.

The light quantity of a beam emitted from a light source, though generally proportional to an electric current injected, has a problem that it has large offsets among individual beams and varies according to an ambient temperature. In the playing back, or the recording in particular, of an optical disc, the light quantity of a beam thrown onto the optical disc must be controlled precisely. To meet this requirement, the optical head 001 is constructed to be able to perform a feedback control that keeps the light quantity on the optical disc at a predetermined level by detecting with the front monitor 005 the light quantity of a split beam reflected from the beam splitter 004.

The light beam transformed by the collimator lens 006 into an almost parallel beam enters an objective 009 that focuses it on an information layer of the optical disc 011.

The objective 009 is mounted on an actuator 010 so that it can be driven in at least x and y directions. In FIG. 1, arrow x represents a direction perpendicular to a track on the information layer of the optical disc 011, arrow y represents a direction normal to the information layer, and arrow z represents a direction parallel to a track on the information layer. That is, the x direction is used for a control based on a track error signal and for a shifting of the lens; and the y direction is used for a control based on a focus error signal. The beam reflected from the optical disc 011 travels back through the objective 009 and the collimator lens 006 and is reflected by the beam splitter 004 before entering the beam dividing element 012. When it reaches the beam dividing element 012, the beam is divided in its cross section by individual dividing areas of the dividing element 012.

In this embodiment, the act of dividing the light quantity of a beam in one and the same cross-sectional area is described as a "splitting" of the beam and that of dividing a beam cross section into smaller areas as a "dividing" of the beam.

For example, in a diffraction grating, dividing a beam into a 0th beam and a plus or minus primary beam or dividing the beam by a beam splitter into a penetrating beam and a reflected beam corresponds to the splitting. The beam dividing element 012 in this embodiment is a device to divide the cross section of a beam into a plurality of smaller areas.

The beams divided by the beam dividing element 012 are detected by a plurality of light receiving areas of the light detector 013. The beams led to the light detector 013 are used to generate a playback signals of data recorded in the information layer of the optical disc 011 and a position control signal of a light spot formed on the optical disc.

A light path extending from the light source 002 to the optical disc 011 is hereinafter referred to as a forward path and a light path from the optical disc 011 to the light detector 013 is referred to as a return path.

The beam dividing element may be put on a section of the light path that the forward path and the return path commonly share (between the beam splitter and the objective). In that case, a use may be made of polarization in order to prevent the beam on the return path from being divided. It is, however, desirable to place the beam dividing element between the beam splitter 004 and the light detector 013, as with the beam dividing element 012. The beam dividing element 012, as it is arranged between the beam splitter 004 and the light detector 013, can use inexpensive non-polarizing parts.

A positional relation in the y direction between the optical disc 011 and the objective 010 that makes the beam collected and thrown by the objective 009 on the optical disc 011 minimal is referred to as a focused position. A disc-objective positional relation in which the distance in the y direction between the objective 009 and the optical disc 011 is shorter than a focused length—a disc-objective distance when they are at the focused position—is referred to as a shorter-than-the-focused-length position. A positional relation in which the distance in the y direction between the objective 009 and the optical disc 011 is longer than that of the focused position is referred to as a longer-than-the-focused-length position.

Figure 2:
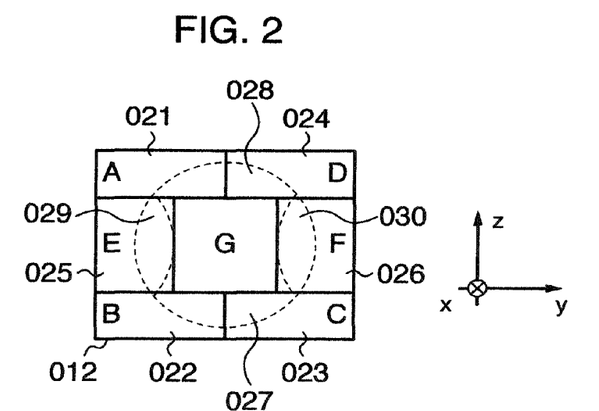
FIG. 2 schematically shows a construction of a beam dividing element 012 in Embodiment 1.

FIG. 2 is a schematic diagram showing a construction of the beam dividing element 012, as seen from the beam splitter 004. The beam dividing element 012 has seven areas—a beam dividing area A 021, a beam dividing area B 022, a beam dividing area C 023, a beam dividing area D 024, a beam dividing area E 025, a beam dividing area F 026 and a beam dividing area G 027. A beam 028 incident on the beam dividing element 012 is shown in a circular dashed line. The beam 028 focused on an optical disc normally has push-pull patterns 029, 030 formed in its cross section on a track of the disc.

The beam dividing area G 027 is an area including a center of the beam 028. That part of the beam 28 passing through the beam dividing area G 027 has its travel path bent toward a predetermined direction and is also given an astigmatism. This may be realized, for example, by forming the beam dividing area G 027 as a plane of blazed grating grooves that causes a beam passing through it to generate only a primary light and making the grating groove pattern a holographic plane. Such a beam dividing area may also be realized by forming the area without a grating groove into a cylindrical surface and inclining that surface.

This astigmatism is used to generate a focus error signal. Ordinary astigmatism-based optical heads generate a track error signal and a focus error signal from signals detected from the same light receiving area, so that astigmatism needs to be applied in a direction tilted by 45 degrees (y-z plane in the figure) from a tangential direction of the optical disc. In this embodiment, since the track error signal and the focus error signal are produced from signals detected from different light receiving areas, astigmatism may be applied in any desired direction. This embodiment takes an example case in which astigmatism is applied in a direction parallel to a tangential direction of an optical disc.

The beam dividing area E 025 and the beam dividing area F 026 are arranged on both sides of the beam dividing area G 027 in a direction (y in the figure) perpendicular to a track of the optical disc. The beam dividing area A 021 and the beam dividing area B 022, as well as the beam dividing area C 023 and the beam dividing area D 024, are arranged on both sides of the beam dividing area G 027 in a direction (z in the figure) parallel to the track. The beam dividing element 012 is desirably adjusted with respect to the optical head so that a boundary between the beam dividing area A 021 and the beam dividing area D 024 and a boundary between the beam dividing area B 022 and the beam dividing area C 023 are aligned with the center of the beam 028. This adjustment is made for the following reason. The movement of the objective 009 in controlling the track error signal causes the beam 028 on the beam dividing element 012 to move in a direction corresponding to y in the figure. The arrangement of the boundaries as described above allows the track error signal to be controlled in a laterally balanced state within a movable range of the objective 009.

Beams, upon passing through the beam dividing areas A 021, B 022, C 023, D 024, E 025, F 026, have their propagating paths bent in toward predetermined directions. Such beam dividing areas may be realized, for example, by forming each area as a surface of blazed grating grooves that produces only a primary light when a beam passes through it and making the grating groove patterns linear. Further, each of the beam dividing areas can also be realized by forming it as a flat surface without grating grooves and tilting it.

In a 1-beam DPP method, a beam is divided into two sections—one whose push-pull pattern area is large and one whose push-pull pattern area is small—with the former used as a push-pull signal and the latter as an offset signal to produce an offset-free track error signal based on a differential between the push-pull signal and the offset signal. The beam dividing element 012 is therefore divided into a section made up of the beam dividing areas E 025, F 026 having large overlapping areas with the push-pull patterns 029, 030 and a section made up of the beam dividing areas A 021, B 022, C 023, D 024 having small overlapping areas with the push-pull patterns 029, 030.

Further, to prevent a possible occurrence of local offsets in the track error signal at boundaries between recorded and unrecorded areas, the 1-beam DPP method does not use a central area of the beam, i.e., the beam dividing area G 027, for the generation of the tracking error signal. That is, this area can be used to generate the focus error signal. In an astigmatism-based method, the focus error signal may sometimes be superimposed with the push-pull signal to cause external disturbances. The use of the beam dividing area G 027 having a small overlapping area with the push-pull patterns 029, 030 to produce a focus error signal offers an advantage of being able to reduce the possibility of the push-pull signal becoming external disturbances to the focus error signal.

Figure 3:
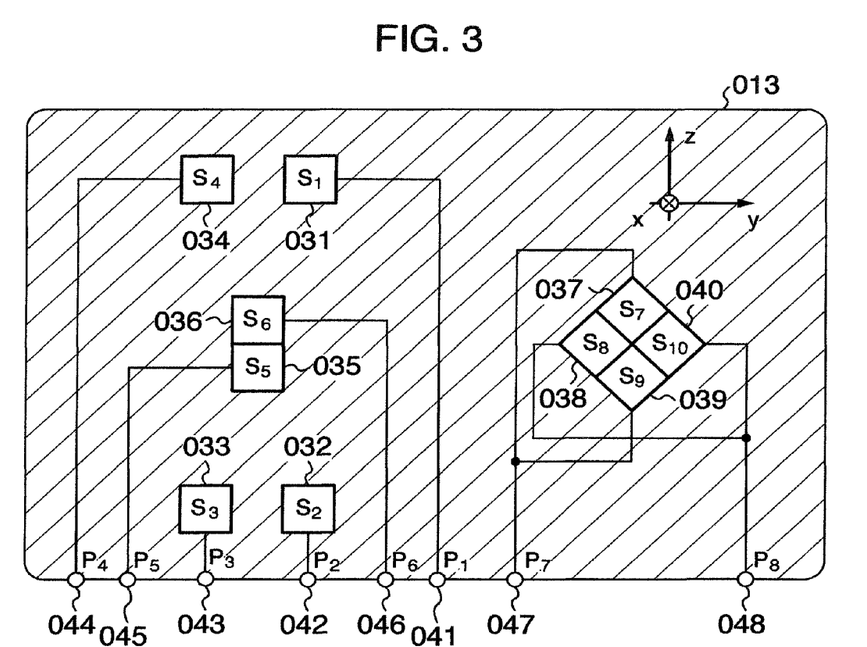
FIG. 3 schematically shows a construction of a light detector 013 in Embodiment 1.

FIG. 3 schematically shows a construction of a light detector 013, as seen from the beam splitter 004.

The light detector 013 has 10 light receiving areas—a light receiving area $S_1$ 031, a light receiving area $S_2$ 032, a light receiving area $S_3$ 033, a light receiving area $S_4$ 034, a light receiving area $S_5$ 035, a light receiving area $S_6$ 036, a light receiving area $S_7$ 037, a light receiving area $S_8$ 038, a light receiving area $S_9$ 039 and a light receiving area $S_{10}$ 040.

The light receiving area $S_1$ 031 receives a beam picked up by the beam dividing area A 021. The light receiving area $S_1$ 031 produces an electric current in proportion to a received light quantity and, through a current/voltage conversion device (not shown), outputs from a terminal $P_1$ 041 a voltage signal corresponding to the light quantity of the beam.

The light receiving area $S_2$ 032 receives a beam picked up by the beam dividing area B 022. The light receiving area $S_2$ 032 produces an electric current in proportion to a received light quantity and, through a current/voltage conversion device (not shown), outputs from a terminal $P_2$ 042 a voltage signal corresponding to the light quantity of the beam.

The light receiving area $S_3$ 033 receives a beam picked up by the beam dividing area C 023. The light receiving area $S_3$ 033 produces an electric current in proportion to a received light quantity and, through a current/voltage conversion device (not shown), outputs from a terminal $P_3$ 043 a voltage signal corresponding to the light quantity of the beam.

The light receiving area $S_4$ 034 receives a beam picked up by the beam dividing area D 024. The light receiving area $S_4$ 034 produces an electric current in proportion to a received light quantity and, through a current/voltage conversion device (not shown), outputs from a terminal $P_4$ 044 a voltage signal corresponding to the light quantity of the beam.

The light receiving area $S_5$ 035 receives a beam picked up by the beam dividing area E 025. The light receiving area $S_5$ 035 produces an electric current in proportion to a received light quantity and, through a current/voltage conversion device (not shown), outputs from a terminal $P_5$ 045 a voltage signal corresponding to the light quantity of the beam as a signal.

The light receiving area $S_6$ 036 receives a beam picked up by the beam dividing area F 026. The light receiving area $S_6$ 036 produces an electric current in proportion to a received light quantity and, through a current/voltage conversion device (not shown), outputs from a terminal $P_6$ 046 a voltage signal corresponding to the light quantity of the beam.

The light receiving area $S_7$ 037, the light receiving area $S_8$ 038, the light receiving area $S_9$ 039 and the light receiving area $S_{10}$ 040 together receive a beam picked up by the beam dividing area G 027. The light receiving area $S_7$ 037 and the light receiving area $S_9$ 039 generate electric currents in proportion to received light quantities, which are then added up and converted by a current/voltage conversion device (not shown) into a voltage signal corresponding to the received light quantity before being output from a terminal $P_7$ 047. The light receiving area $S_8$ 038 and the light receiving area $S_{10}$ 040 generate electric currents in proportion to received light quantities, which are then added up and converted by a current/voltage conversion device (not shown) into a voltage signal corresponding to the received light quantity before being output from a terminal $P_8$ 048.

Next, processing to generate a signal required by the optical head from the signal of the light detector 013 will be explained. The focus error signal (FE) can be produced from Equation 1, the track error signal (TE1) based on the DPD method can be obtained from Equation 2, the track error signal (TE2) based on the 1-beam DPP method from Equation 3 and the signal (RF) as a playback signal from Equation 4.

$$FE=(P_7-P_8) \quad \text{(Equation 1)}$$

$$TE1=(\delta P_1+\delta P_3)-(\delta P_2+\delta P_4) \quad \text{(Equation 2)}$$

$$TE2=[(P_5)-(P_6)]-k\times(P_1+P_4-P_2-P_3) \quad \text{(Equation 3)}$$

$$RF=(P_1+P_2+P_3+P_4+P_5+P_6+P_7+P_8) \quad \text{(Equation 4)}$$

In the above equations, $P_1$ corresponds to a signal output from terminal $P_1$ 041. In the DPD method each output is computed after being phase-detected and $\delta P_1$ in Equation 1 means an output after being phase-detected. A coefficient k in Equation 3 is to remove an offset and is determined mainly by a ratio between the light quantity of beams incident on the beam dividing area E 025 and the beam dividing area F 026 and the light quantity of beams incident on the beam dividing area A 021, the beam dividing area B 022, the beam dividing area C 023 and the beam dividing area D 024. While this embodiment wires the signal outputs as shown in FIG. 3, other constructions may be adopted in which there are no such wirings. But the wiring as described above offers an advantage of being able to reduce the number of output terminals.

Next, referring to FIG. 4 and FIG. 5, a relation between light receiving areas of the light detector 013 and beams divided by the beam dividing element 012 will be explained.

Figure 4:
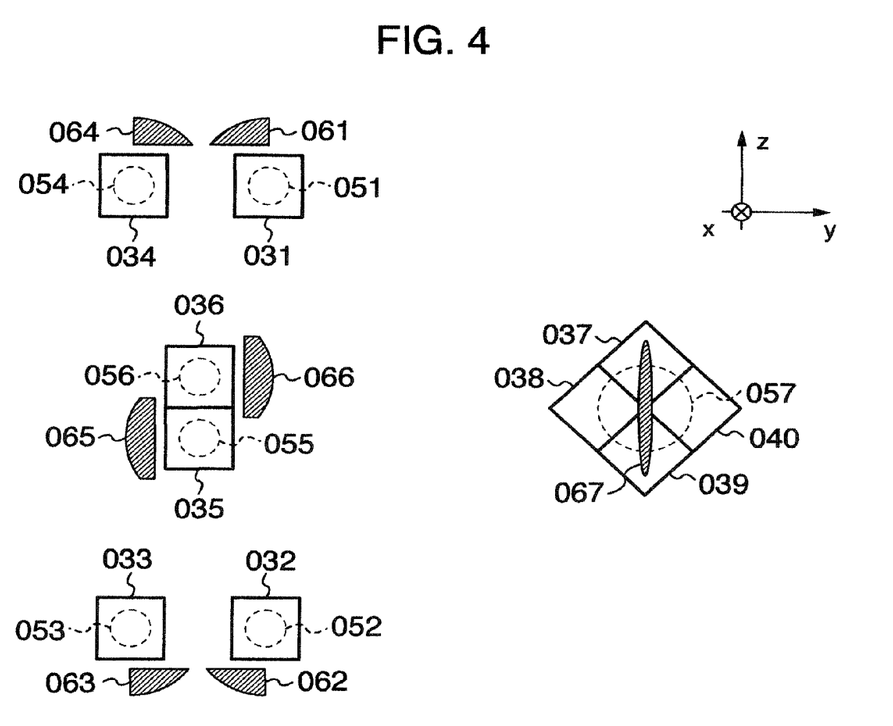
FIG. 4 shows a light beam on the light detector 013 that is at a shorter-than-the-focused-length position in Embodiment 1.

FIG. 4 is a schematic diagram showing a relation between the light receiving areas of the light detector 013 and the beams divided by the beam dividing element 012 when the disc-objective relation is at the shorter-than-the-focused-length position.

Figure 5:
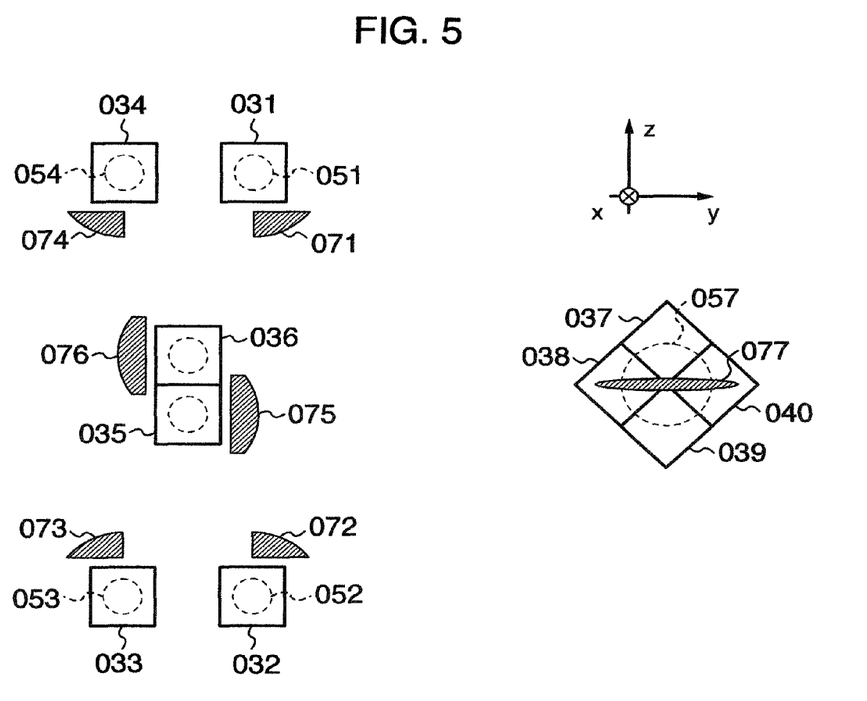
FIG. 5 shows a light beam on the light detector 013 that is at a longer-than-the-focused-length position in Embodiment 1.

FIG. 5 is a schematic diagram showing a relation between the light receiving areas of the light detector 013 and the beams divided by the beam dividing element 012 when the disc-objective relation is at the longer-than-the-focused-length position. FIG. 4 and FIG. 5 show the light detector 013 as seen from the beam splitter 004. The light receiving areas in FIG. 4 and FIG. 5 are the same as that of FIG. 3, with like reference symbols assigned to the respective light receiving areas. Beams when the disc-objective relation is at the focused position are shown in a circular dashed line and those when the disc-objective relation is at the shorter-than-the-focused-length or longer-than-the-focused-length position are shown hatched.

The light detector 013 is preferably adjusted (in the x direction of FIG. 1) and assembled so that, when the disc-objective relation is at the focused position, the beams divided by the beam dividing element 012 become focused on the light detector. In this embodiment, too, since beams divided by the beam dividing element 012 are assumed to be focused on the light detector, the beams when the disc-objective relation is at the focused position are shown in a circular form.

When the disc-objective relation is at the shorter-than-the-focused-length position, beams are similar in shape to those in the individual areas of the beam dividing element 012. In FIG. 4, therefore, beams divided by the beam dividing element 012 are also shown to have the same shapes as those in the individual areas of the beam dividing element 012. When the disc-objective relation is at the longer-than-the-focused-length position, beams are symmetric to the areas of the beam dividing element 012 with respect to each of the focused points on the light detector 013. So, FIG. 5 shows the beams divided by the beam dividing element 012 in shapes symmetric to those of FIG. 4 with respect to the associated focused points.

A setting is made to cause the beam 051 picked up by the beam dividing area A 021 to fall on the light receiving area $S_1$ 031 when the disc-objective relation is at the focused position.

When the disc-objective relation is at the shorter-than-the-focused-length position, the beam 061 picked up by the beam dividing area A 021 moves toward the upper left of the light receiving area $S_1$ 031, as shown in FIG. 4. At this time the beam 061 has the same shape as that in the beam dividing area A 021.

When the disc-objective relation is at the longer-than-the-focused-length position, the beam 071 picked up by the beam dividing area A 021 moves toward the lower right of the light receiving area $S_1$ 031, as shown in FIG. 5. At this time the shapes of the beam 061 and the beam 071 are point-symmetric to each other with respect to the center of the beam 051.

As described above, the beam picked up by the beam dividing area A 021 moves to the upper left and to the lower right of the light receiving area $S_1$ 031. But in the direction of beam movement there is no other light receiving area that generates a track error signal. It can be said therefore that, even if a focus shift occurs, the beam picked up by the beam dividing area A 021 does not fall on any other light receiving areas that will generate a track error signal.

A setting is made to cause the beam 052 picked up by the beam dividing area B 022 to fall on the light receiving area $S_2$ 032 when the disc-objective relation is at the focused position.

When the disc-objective relation is at the shorter-than-the-focused-length position, the beam 062 picked up by the beam dividing area B 022 moves toward the lower left of the light receiving area $S_2$ 032, as shown in FIG. 4. At this time the beam 062 has the same shape as that in the beam dividing area B 022.

When the disc-objective relation is at the longer-than-the-focused-length position, the beam 072 picked up by the beam dividing area B 022 moves toward the upper right of the light receiving area $S_2$ 032, as shown in FIG. 5. At this time the shapes of the beam 062 and the beam 072 are point-symmetric to each other with respect to the center of the beam 052.

As described above, the beam picked up by the beam dividing area B 022 moves to the lower left and to the upper right of the light receiving area $S_2$ 032. But in the direction of beam movement there is no other light receiving area that generates a track error signal. It can be said therefore that, even if a focus shift occurs, the beam picked up by the beam dividing area B 022 also does not fall on any other light receiving areas that will generate a track error signal.

A setting is made to cause the beam 053 picked up by the beam dividing area C 023 to fall on the light receiving area $S_3$ 033 when the disc-objective relation is at the focused position.

When the disc-objective relation is at the shorter-than-the-focused-length position, the beam 063 picked up by the beam dividing area C 023 moves toward the lower right of the light receiving area $S_3$ 033, as shown in FIG. 4. At this time the beam 063 has the same shape as that in the beam dividing area C 023.

When the disc-objective relation is at the longer-than-the-focused-length position, the beam 073 picked up by the beam dividing area C 023 moves toward the upper left of the light receiving area $S_3$ 033, as shown in FIG. 5. At this time the shapes of the beam 063 and the beam 073 are point-symmetric to each other with respect to the center of the beam 053.

As described above, the beam picked up by the beam dividing area C 023 moves to the lower right and to the upper left of the light receiving area $S_3$ 033. But in the direction of beam movement there is no other light receiving area that generates a track error signal. It can be said therefore that, even if a focus shift occurs, the beam picked up by the beam dividing area C 023 also does not fall on any other light receiving areas that will generate a track error signal.

A setting is made so that the beam 054 picked up by the beam dividing area D 024 will fall on the light receiving area $S_4$ 034 when the disc-objective relation is at the focused position.

When the disc-objective relation is at the shorter-than-the-focused-length position, the beam 064 picked up by the beam dividing area D 024 moves toward the upper right of the light receiving area $S_4$ 034, as shown in FIG. 4. At this time the beam 064 has the same shape as that in the beam dividing area D 024.

When the disc-objective relation is at the longer-than-the-focused-length position, the beam 074 picked up by the beam dividing area D 024 moves toward the lower left of the light receiving area $S_4$ 034, as shown in FIG. 5. At this time the shapes of the beam 064 and the beam 074 are point-symmetric to each other with respect to the center of the beam 054.

As described above, the beam picked up by the beam dividing area D 024 moves to the upper right and to the lower left of the light receiving area $S_4$ 034. But in the direction of beam movement there is no other light receiving area that generates a track error signal. It can be said therefore that, even if a focus shift occurs, the beam picked up by the beam dividing area D 024 also does not fall on any other light receiving areas that will generate a track error signal.

A setting is made so that the beam 055 picked up by the beam dividing area E 025 will fall on the light receiving area $S_5$ 035 when the disc-objective relation is at the focused position.

When the disc-objective relation is at the shorter-than-the-focused-length position, the beam 065 picked up by the beam dividing area E 025 moves toward the left of the light receiving area $S_5$ 035, as shown in FIG. 4. At this time the beam 065 has the same shape as that in the beam dividing area E 025.

When the disc-objective relation is at the longer-than-the-focused-length position, the beam 075 picked up by the beam dividing area E 025 moves toward the right of the light receiving area $S_5$ 035, as shown in FIG. 5. At this time the shapes of the beam 065 and the beam 075 are point-symmetric to each other with respect to the center of the beam 055.

As described above, the beam picked up by the beam dividing area E 025 moves to the left and to the right of the light receiving area $S_5$ 035. But in the direction of beam movement there is no other light receiving area that generates a track error signal. It can be said therefore that, even if a focus shift occurs, the beam picked up by the beam dividing area E 025 also does not fall on any other light receiving areas that will generate a track error signal.

A setting is made so that the beam 056 picked up by the beam dividing area F 026 will fall on the light receiving area $S_6$ 036 when the disc-objective relation is at the focused position.

When the disc-objective relation is at the shorter-than-the-focused-length position, the beam 066 picked up by the beam dividing area F 026 moves toward the right of the light receiving area $S_6$ 036, as shown in FIG. 4. At this time the beam 066 has the same shape as that in the beam dividing area F 026.

When the disc-objective relation is at the longer-than-the-focused-length position, the beam 076 picked up by the beam dividing area F 026 moves toward the left of the light receiving area $S_6$ 036, as shown in FIG. 5. At this time the shapes of the beam 066 and the beam 076 are point-symmetric to each other with respect to the center of the beam 056.

As described above, the beam picked up by the beam dividing area F 026 moves to the right and to the left of the light receiving area $S_6$ 036. But in the direction of beam movement there is no other light receiving area that generates a track error signal. It can be said therefore that, even if a focus shift occurs, the beam picked up by the beam dividing area F 026 also does not fall on any other light receiving areas that will generate a track error signal.

A setting is made so that the beam 057 picked up by the beam dividing area G 027 will fall on the center of an overall combined area consisting of the light receiving area $S_7$ 037, the light receiving area $S_8$ 038, the light receiving area $S_9$ 039 and the light receiving area $S_{10}$ 040.

Unlike beams passing through other beam dividing areas, the beam 057 picked up by the beam dividing area G 027 is given an astigmatism and therefore its size on the light detector 013 is made larger.

When the disc-objective relation is at the shorter-than-the-focused-length position, an astigmatism is applied in a direction parallel to a tangent to the optical disc. This makes the beam 067 picked up by the beam dividing area G 027 vertically elongate in the figure, increasing the quantity of light incident on the light receiving area $S_7$ 037 and the light receiving area $S_9$ 039.

When the disc-objective relation is at the larger-than-the-focused-length position, the beam 077 picked up by the beam dividing area G 027 becomes laterally elongate, increasing the quantity of light incident on the light receiving area $S_8$ 038 and the light receiving area $S_{10}$ 040.

Based on the principle of astigmatism described above, the focus error signal is detectable by Equation 1.

Optical discs, such as BD's and DVD's, in recent years have increased their storage capacity by using multiple information layers. In such multilayer optical discs, beams reflected from other information layers become disturbances for a particular information layer being played back, making it impossible to obtain stable track error signals in the DPP and 3-spot systems that emit a plurality of beams onto an optical disc. For this reason, a growing number of 1-beam DPP systems have come to be used frequently in recent years which can completely separate on the light detector beams reflected from a particular information layer and those reflected from other information layers.

Beams reflected from other information layers correspond to those beams on the light detector that are formed when the disc-objective relation is at the shorter-than-the-focused-length position or the longer-than-the-focused-length position. As explained in FIG. 4 and FIG. 5, beams produced at the shorter-than-the-focused-length position or the longer-than-the-focused-length position do not fall on the light receiving areas that generate track error signals, $S_1$ 031, $S_2$ 032, $S_3$ 033, $S_4$ 034, $S_5$ 035, $S_6$ 036. Therefore the optical head 001 of this embodiment, too, can be said to be able to produce a stable track error signal from multilayered optical discs.

While Embodiment 1 has taken up an example arrangement of the light receiving areas in FIG. 3 for explanation, they may be arranged in any desired manner as long as beams reflected from other information layers do not enter as disturbances into the light receiving areas that generate track error signals of the 1-beam DPP system. For example, in FIG. 3 the light receiving area $S_2$ 032 may be moved to the left of the light receiving area $S_4$ 034, or the light receiving area $S_3$ 033 may be moved to the right of $S_1$ 031.

[Embodiment 2]

Embodiment 2 of this invention will be described with reference to drawings. The following description concerns variations of the beam dividing element 012 and the light detector 013 of the optical head 001 in Embodiment 1. The optical head of Embodiment 2 differs from that of Embodiment 1 in that a beam dividing element 101 has a different beam dividing area pattern from that of the beam dividing element 012 and that a light detector 303 has a different light receiving area pattern from the light detector 013.

Figure 6:
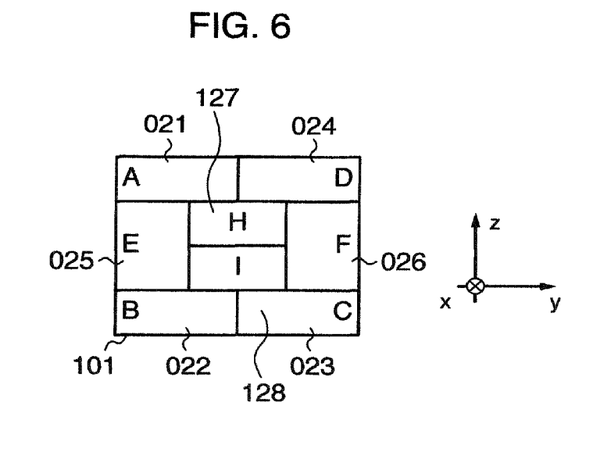
FIG. 6 schematically shows a construction of a beam dividing element 101 in Embodiment 2.

FIG. 6 is a schematic diagram showing a construction of the beam dividing element 101, as seen from the beam splitter 0004. The beam dividing element 101 differs from the beam dividing element 012 in that the beam dividing area G 027 is divided in two—a beam dividing area H 127 and a beam dividing area I 128. Other areas are the same as those of the beam dividing element 012. So, their explanation is omitted here.

The beam dividing area H 127 and the beam dividing area I 128 are the result of dividing the beam dividing area G 027 in a direction (z direction in the figure) parallel to the track. It is desired that the beam dividing element 101 be adjusted (in the z direction) with respect to the optical head so that the boundary between the beam dividing area H 127 and the beam dividing area I 128 aligns with the center of the beam. This ensures that the focus error signal will be balanced if the beam dividing element 101 shifts in the direction of z in the figure.

The beam, upon passing through the beam dividing area H 127, has its propagating path bent toward a predetermined direction and also given a defocus aberration in a direction toward the shorter-than-the-focused-length position. The beam, on passing through the beam dividing area I 128, has its propagating path bent toward a predetermined direction and also given a defocus aberration in a direction toward the longer-than-the-focused-length position as opposed to the case of the beam dividing area H 127. These defocus aberration can be realized, for example, by forming the beam dividing area G 027 as a plane of blazed grating grooves that causes a beam passing through it to generate only a primary light and making the grating groove pattern a holographic plane. It can also be realized by forming the area without a grating groove into a spherical surface and inclining that surface. This defocus aberration is used for generating a focus error signal. While this embodiment has described an example case where the beam dividing area G 027 is divided in two in a direction parallel to the track, the area may also be divided in two in two orthogonal directions for a total of four subdivided areas to generate the focus error signal. Dividing the area in four offers an advantage of minimizing a balance shift of the focus error signal in the direction of z in the figure. Fewer subdivided areas make it easy to fabricate the beam dividing element.

Figure 7:
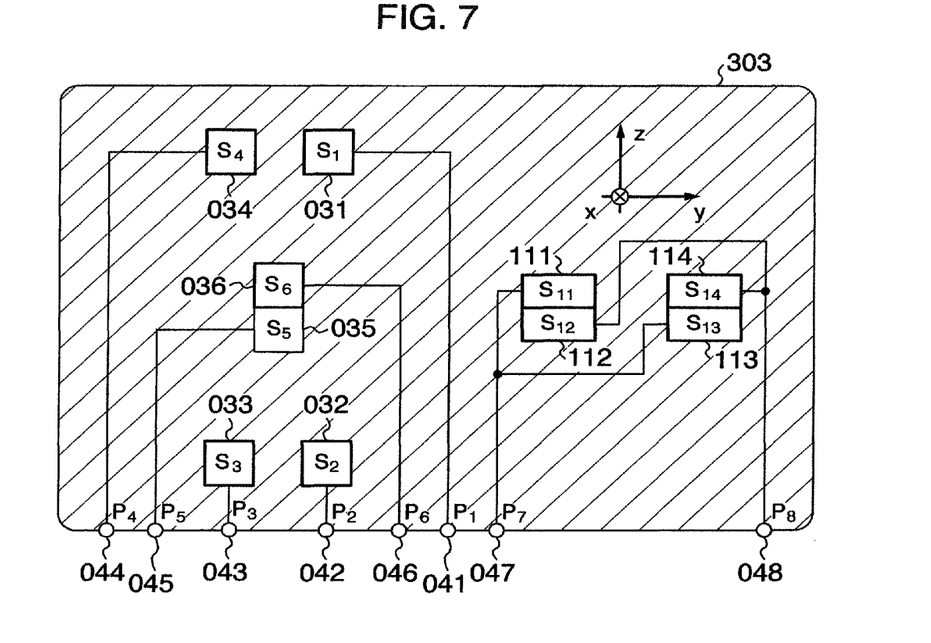
FIG. 7 schematically shows a construction of a light detector 303 in Embodiment 2.

FIG. 7 is a schematic diagram showing a construction of the light detector 303, as seen from the beam splitter 004. The light detector 303 differs from its counterpart of the previous embodiment in that the light receiving areas $S_7$ 037, $S_8$ 038, $S_9$ 039, $S_{10}$ 040 are changed to light receiving areas $S_{11}$ 111, $S_{12}$ 112, $S_{13}$ 113, $S_{14}$ 114. Other light receiving areas are similar to the corresponding ones in the light detector 013, so their explanations are omitted.

The light receiving area $S_{11}$ 111 and the light receiving area $S_{12}$ 112 are the ones to receive a beam picked up by the beam dividing area H 127. The light receiving area $S_{13}$ 113 and the light receiving area $S_{14}$ 114 are the ones to receive a beam picked up by the beam dividing area I 128.

The light receiving area $S_{11}$ 111 and the light receiving area $S_{13}$ 113 produce electric currents in proportion to the quantities of light received, which are then added up and converted by a current/voltage conversion device (not shown) into a voltage signal corresponding to the received light quantity before being output from the terminal $P_7$ 047. The light receiving area $S_{12}$ 112 and the light receiving area $S_{14}$ 114 produce electric currents in proportion to the quantities of light received, which are then added up and converted by a current/voltage conversion device (not shown) into a voltage signal corresponding to the received light quantity before being output from the terminal $P_8$ 048.

Signals necessary for the optical head can be generated from the signals obtained by the light detector 303 according to Equation 1 through Equation 4.

While this embodiment wires the signal outputs as shown in FIG. 7, other configurations may also be adopted in which no such wiring is made. The wiring as described above, however, offers an advantage of being able to minimize the number of output terminals.

Next referring to FIG. 8 and FIG. 9, a relation between light receiving areas of the light detector 303 and beams divided by areas of the beam dividing element 101 will be described.

Figure 8:
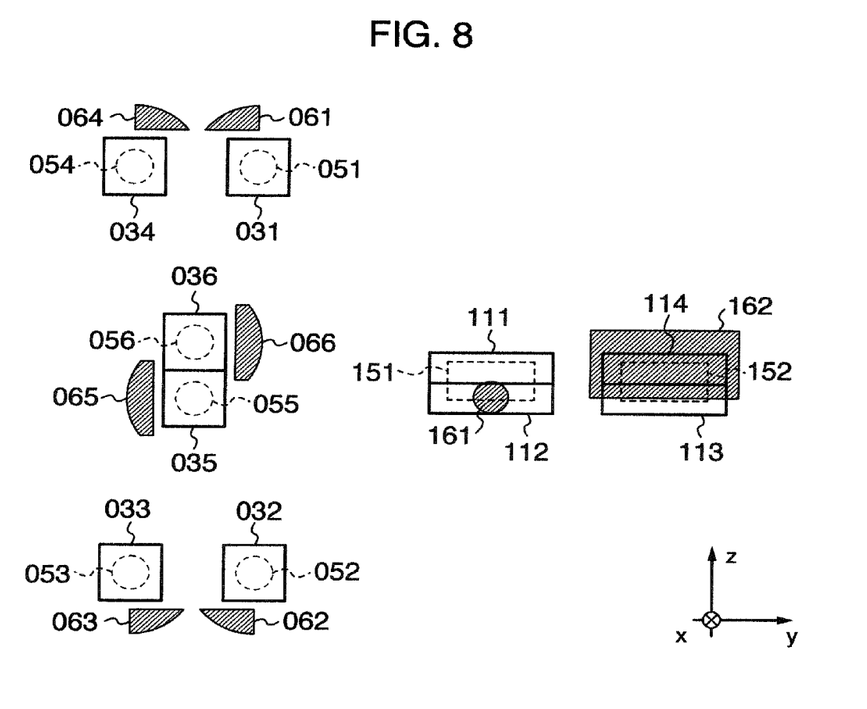
FIG. 8 shows a light beam on the light detector 303 that is at a shorter-than-the-focused-length position in Embodiment 2.

FIG. 8 is a schematic diagram showing a relation between light receiving areas of the light detector 303 and beams divided by the areas of the beam dividing element 101 when the disc-objective relation is at the shorter-than-the-focused-length position.

Figure 9:
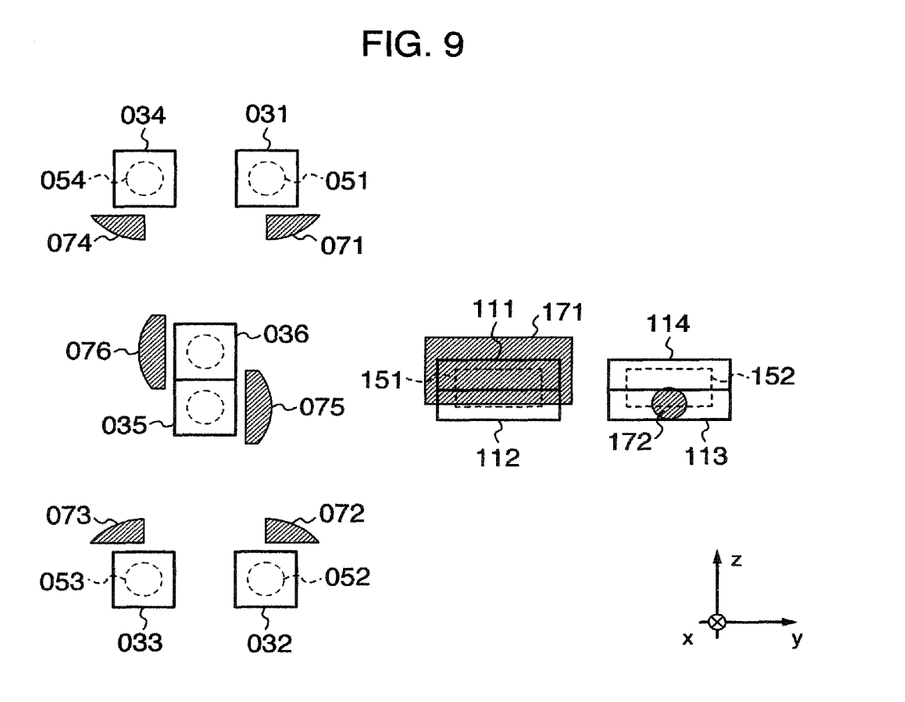
FIG. 9 shows a light beam on the light detector 303 that is at a longer-than-the-focused-length position in Embodiment 2.

FIG. 9 is a schematic diagram showing a relation between the light receiving areas of the light detector 303 and beams divided by the areas of the beam dividing element 101 when the disc-objective relation is at the longer-than-the-focused-length position. The light receiving areas in FIG. 8 and FIG. 9 are the same as those in FIG. 7 and assigned like reference symbols. Beams when the disc-objective relation is at the focused position are shown in a circular dashed line and those when the disc-objective relation is at the longer-than-the-focused-length or longer-than-the-focused-length position are shown hatched. As described above, it is assumed also in Embodiment 2 that a beam divided by the beam dividing element 101 is focused on the light detector 303.

The beams picked up by the same areas of the beam dividing element 101 as the corresponding ones of the beam dividing element 012 fall on the same light receiving areas of the light detector 303 as the corresponding areas of the light detector 013. So, their explanation is not given here.

A setting is made so that a beam 151 passing through the beam dividing area H 127 will fall on the center of an overall combined area of the light receiving area $S_{11}$ 111 and the light receiving area $S_{12}$ 112 when the disc-objective relation is at the focused position. The beam 151 that has passed through the beam dividing area H 127 is imparted a defocus aberration in a direction toward the longer-than-the-focused-length position and therefore has on the light detector 303 a cross-sectional shape corresponding to a predetermined longer-than-the-focused-length position.

When the disc-objective relation is at the shorter-than-the-focused-length position, since a beam 161 passing through the beam dividing area H 127 is already applied with a defocus corresponding to the longer-than-the-focused-length position, the opposite defocusing tendencies cancel each other out, resulting in the beam cross section becoming circular, a shape that is formed when the disc-objective relation is at the focused position. At this time, the amount of light received on the light receiving area $S_{12}$ 112 increases.

When the disc-objective relation is at the longer-than-the-focused-length position, since a beam 171 picked up by the beam dividing area H 127 is already applied with a defocus corresponding to the longer-than-the-focused-length position, these similar defocusing tendencies are superimposed making the beam cross section even larger. At this time, the amount of light received on the light receiving area $S_{11}$ 111 increases.

A beam 152 that has passed through the beam dividing area I 128 is set to fall on the center of combined light receiving areas $S_{13}$ 113 and $S_{14}$ 114 when the disc-objective relation is at the focused position. The beam 152 picked up by the beam dividing area I 128 is already imparted a defocus aberration in a direction toward the shorter-than-the-focused-length position and therefore has on the light detector 303 a cross-sectional shape corresponding to a predetermined shorter-than-the-focused-length position, i.e., the same shape as the beam dividing area I 128.

When the disc-objective relation is at the shorter-than-the-focused-length position, since a beam 162 passing through the beam dividing area I 128 is already imparted a defocus corresponding to the shorter-than-the-focused-length position, the similar defocusing tendencies are superimposed making the beam cross section even larger. At this time, the quantity of light received on the light receiving area $S_{14}$ 114 increases.

When the disc-objective relation is at the longer-than-the-focused-length position, since a beam 172 passing through the beam dividing area I 128 is already applied a defocus corresponding to the shorter-than-the-focused-length position, the opposing defocusing tendencies cancel each other out, resulting in the beam cross section becoming circular, a shape that is formed when the disc-objective relation is at the focused position. At this time, the quantity of light received on the light receiving area $S_{13}$ 113 increases.

Based on the principle of the so-called spot size method described above, the focus error signal can be detected by Equation 1.

The generation of the track error signal is the same as in the optical head of Embodiment 1. So, Embodiment 2 also can be said to be able to generate a stable track error signal from multilayered optical discs.

Although Embodiment 2 has described an example case where the light receiving areas $S_{11}$ 111 and $S_{12}$ 112 of the light detector 303 are arranged on the left side of the light receiving areas $S_{13}$ 113 and $S_{14}$ 114, other arrangements, for example, with the positions of the left and right light receiving areas reversed, may also be used as long as the focus error signal based on the spot size method taking advantage of the defocus characteristics of beams can be generated.

[Embodiment 3]

Embodiment 3 of this invention will be described by referring to the accompanying drawings. Here as an example that realizes a pattern of the beam dividing element 012 of Embodiment 1, a beam dividing element 190 will be explained.

Figure 10:
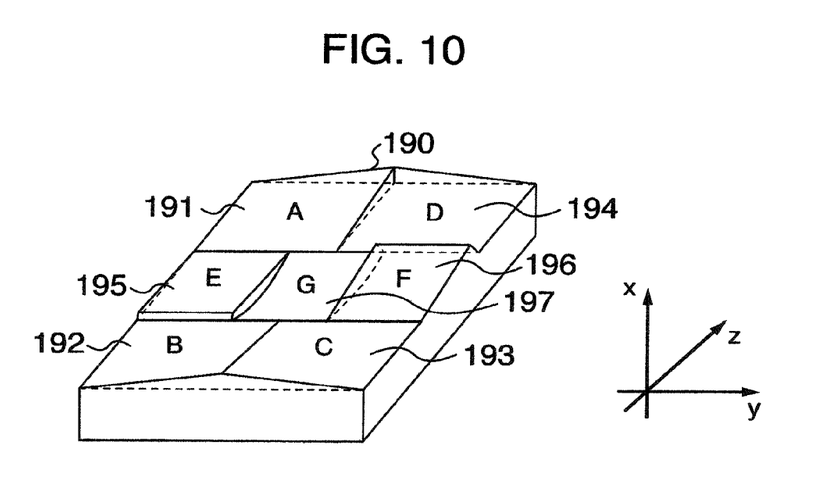
FIG. 10 schematically shows a construction of a beam dividing element 191 in Embodiment 3.

FIG. 10 is a schematic diagram showing a construction of the beam dividing element 190. The beam dividing element 190 has seven beam dividing areas A 191, B 192, C 193, D 194, E 195, F 196 and G 197. These areas correspond to the beam dividing areas A 021, B 022, C 023, D 024, E 025, F 026 and G 027 of the beam dividing element 012 described in the preceding embodiment.

The beam dividing areas A 191, B 192, C 193, D 194, E 195 and F 196 each have a flat surface, with their normals differing in direction. These normals need to be directed toward their associated light receiving surfaces of the light detector. At boundaries between the adjoining areas steps are formed and beams passing through these steps are unwanted beams producing disturbances. So, some provisions need to be made to prevent such unwanted beams from propagating toward the light receiving areas of the light detector, as by properly setting inclinations of the steps.

The beam dividing area G 197 is formed as a cylindrical surface whose generatrix is parallel to the y direction. By properly modifying the area in this way, the astigmatism described in connection with the beam dividing area G 027 can be applied to a beam passing through the area. Further, tilting the normal to the plane of the beam dividing area G 197 toward a specific direction allows a beam to propagate in any desired direction.

While the beam dividing element 190 has been shown to have a single surface divided into a plurality of areas, it may be formed in a two-surface construction with the beam dividing area G 197 on its back.

Figure 11:
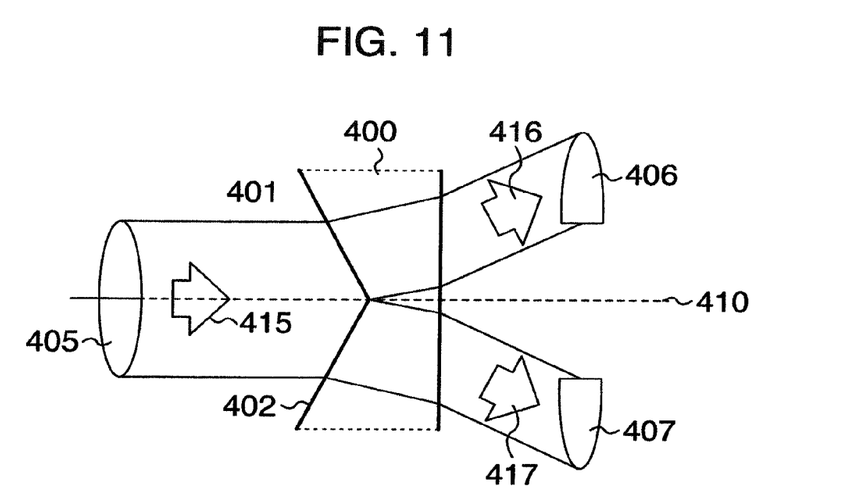
FIG. 11 shows how a light beam is split by a beam dividing element in Embodiment 3.

FIG. 11 shows a principle of how a beam is divided by areas of the beam dividing element 190. A beam dividing element 400 has two beam dividing areas 401, 402 which are inclined a predetermined angle to a direction perpendicular to an axis 410 of a beam. When a beam 405 strikes the beam dividing element 400 from a direction of arrow 415, the propagating path of the beam 405 incident on the beam dividing area 401 is bent according to the Snell's law of refraction along the direction of arrow 416 to form a beam 406. The bent beam 406 is semicircular in cross section.

The beam 405, upon passing through the beam dividing area 402, is bent according to the Snell's law of refraction along the direction of arrow 417 to form a beam 407. It is understood that the bent beam 407 is a remaining part of the beam 405 excluding the beam 406. That is, the beam 405 is divided into two beams by the two areas. The angles of the individual areas of the beam dividing element 190 can be determined with ease as by ray tracing because the beams propagate according to the Snell's law of refraction.

As described above, the beam dividing element 190 is able to divide a beam into a plurality of smaller beams. Further, making an area on the beam dividing element cylindrical can give an astigmatism to a beam passing through that area. It is also possible to form the area spherical to give a beam a defocus aberration.

Although the beam dividing areas A 191, B 192, C 193, D 194, E 195 and F 196 have been assumed to be flat, they may be formed otherwise. For example, by providing the beam dividing areas A 191, B 192, C 193, D 194, E 195 and F 196 with a defocus aberration, the distance of the light detector 013 from the beam dividing element 012 in the optical head 001 can be made variable, thus increasing the degree of freedom in the optical head's structural design and electric wiring design.

[Embodiment 4]

Embodiment 4 of this invention will be described by referring to the accompanying drawings. Here an optical head with two light sources is taken up as an example. This optical head is capable of recording or playing back optical discs standardized for a wavelength 1 and for a wavelength 2. Such optical heads include, for example, DVD- and BD-compatible optical heads that can record or play back optical discs of DVD or BD standard.

Figure 12:
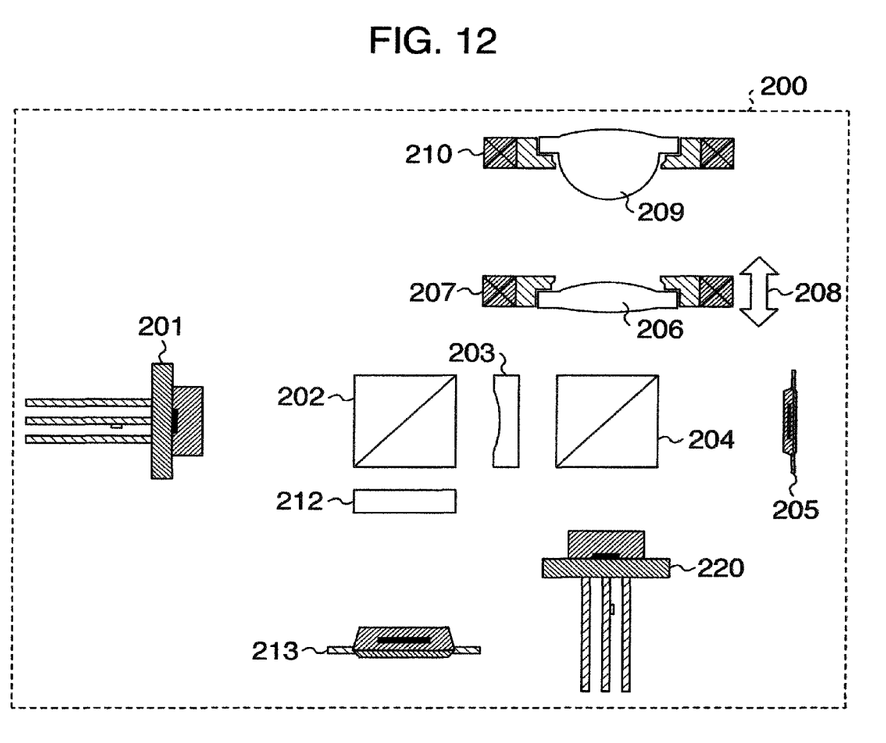
FIG. 12 schematically shows a construction of an optical head 200 in Embodiment 4.

FIG. 12 is a schematic diagram showing a construction of an optical head 200 in Embodiment 4. A beam 1 of wavelength 1 is emitted as scattered light from a light source 201 and a beam 2 of wavelength 2 as scattered light from a light source 220.

First, a beam 1 is explained. The beam 1 emitted from the light source 201 enters a beam splitter 202. The beam splitter 202 is an optical device that splits the incoming beam 1 into a penetrating beam and a reflected beam. The beam splitter 202 is an optical device that has a function to split the incoming beam 2 as well as the incoming beam 1 into a penetrating beam and a reflected beam. The penetrating beam 1 that has passed through the beam splitter 202 propagates to a correction lens 203 that changes a diffusion angle of the beam. The correction lens 203 changes an optical magnification to a level required by an optical disc of wavelength-1 standard or by an optical disc of wavelength-2 standard. A large optical magnification causes a light spot focused on the optical disc to become small in diameter. Since BD and DVD have significantly different optical magnifications, the correction lens is used to allow the optical magnification to be changed between wavelength 1 and wavelength 2. That is, the correction lens 203 is an optical device that can change the diffusion angles of beam 1 and beam 2. The beam 1 whose diffusion angle is changed by the correction lens 203 enters a beam splitter 204. The beam splitter 204 is an optical device that splits each of the beam 1 and beam 2 into a penetrating beam and a reflected beam. Of the beam 1 incident on the beam splitter 204, a portion reflected by the beam splitter propagates to a collimator lens 206 while a penetrating portion of the beam 1 proceeds to a front monitor 205. The beam 1 that has entered the collimator lens 206 is transformed into an almost parallel beam. It is desired that the optical head 200, too, be provided with a spherical aberration correction structure 207 that can be moved in a direction of optical axis (arrow 208).

Detecting the light quantity of the beam 1 that has passed through the beam splitter 204 with the front monitor 205 allows for a feedback control to keep the light quantity on the optical disc at a predetermined level.

The beam 1 transformed into a parallel beam by the collimator lens 206 enters a 2-wavelength-compatible objective 209 that focuses the beam on an information layer of an optical disc (not shown) of wavelength-1 standard. The 2-wavelength-compatible objective 209 is assumed to have predetermined NA's for two wavelengths, respectively. Such 2-wavelength-compatible objectives are in general use and their detailed description is omitted.

The 2-wavelength-compatible objective 209 is mounted on an actuator 210 and can be driven at least in a direction perpendicular to a track on the information layer of the optical disc and in a direction normal to the information layer to perform a control based on the track error signal, drive the lens for shifting and perform a control based on the focus error signal.

The beam 1 reflected from the optical disc 1 passes through the 2-wavelength-compatible objective 209, collimator lens 206, beam splitter 204 and correction lens 203 and is reflected by the beam splitter 202 onto a beam dividing element 212. The beam 1 incident on the beam dividing element 212 is divided into smaller beams by the beam dividing areas of the element. The beam dividing element 212 may be any of the beam dividing elements described in Embodiment 1 through Embodiment 3.

The beam 1 divided by the beam dividing element 212 is detected by a plurality of light receiving areas on the light detector 213.

A plurality of divided beams 1 thrown onto the light detector 213 are used for generating a playback signal from the information layer of the optical disc 1 and for generating position control signals, such as the track error signal and the focus error signal, for the light spot focused on the optical disc.

Next, the behavior of the beam 2 will be explained. The beam 2 emitted from the light source 220 enters the splitter 204.

Of the beam 2 incident on the beam splitter 204, a portion that has penetrated the beam splitter travels to the collimator lens 206 while a reflected portion of the beam 2 reaches the front monitor 205. Like the beam 1, the beam 2 that has entered the collimator lens 206 is transformed into an almost parallel beam and can also have its spherical aberration on the optical disc corrected by the spherical aberration correction structure 207.

Detecting the light quantity of the beam 2 reflected by the beam splitter 204 with the front monitor 205 allows for a feedback control that keeps the light quantity on the optical disc at a predetermined level.

The beam 2 transformed into an almost parallel beam by the collimator lens 206 enters the 2-wavelength-compatible objective 209 that focuses the beam on the information layer of the optical disc 2 (not shown) of wavelength-2 standard. The beam 2 reflected from the optical disc 2 propagates through the 2-wavelength-compatible objective 209, collimator lens 206, beam splitter 204 and correction lens 203 and is reflected by the beam splitter 202 before entering into the beam dividing element 212. The beam dividing element 212 divides the incoming beam 2 into smaller beams by its beam dividing areas. The beam dividing element 212 may be any of the beam dividing elements explained in Embodiment 1 through Embodiment 3. The beams 2 divided by the beam dividing element 212 are detected by a plurality of light receiving areas of the light detector 213. The beams 2 led to the light detector 213 are used to detect a playback signal from the information layer of the optical disc 2 and position control signals, such as the track error signal and the focus error signal, of a light spot focused on the optical disc.

The beam dividing element 212 is desirably similar in construction to the beam dividing element 190 that does not use diffraction. If diffraction is used, a diffraction angle significantly changes between wavelength 1 and wavelength 2, requiring two different light receiving areas for the wavelength 1 and the wavelength 2. If, for example, the pattern of the light detector 013 is designed for the wavelength 1, the detection of the wavelength 2 requires another pattern that is contracted or expanded by a wavelength ratio. That is, different wavelengths require different light receiving areas for detection, making the light detector complicated.

To deal with this problem, the construction similar to that of the beam dividing element 190 is used to make the one pattern of the light detector commonly applicable to both wavelengths. That is, the use of the beam dividing element 190 allows the light detector 013 to be shared by the two wavelengths.

Further, when a beam is divided according to the Snell's law of refraction, as by the beam dividing element 190, beams of unwanted degrees are not generated, as they are when a diffraction grating is employed. The use of the beam dividing element 190 therefore can be said to be advantageous in terms of a high light efficiency in the return path. Further, compared with the DPP-based method, the use of the beam dividing element 190 is also advantageous because it offers a higher light efficiency in the forward path. That is, the optical head described in this embodiment is able to realize high light efficiencies both in the forward and return paths.

Although the optical heads 001 and 200 do not use a reflection mirror, it is possible to install a preliminary setup reflection mirror between the objective and the collimator lens or a reflection mirror for easily arranging optical elements when they are equipped between the light source and the beam splitter.

As described above, the optical head of this embodiment has a light source to emit a beam, an objective to focus the beam on an optical disc, a beam dividing element having a plurality of divided areas by which to divide the cross section of the beam reflected from the optical disc, and a light detector to receive the beams divided by the beam dividing elements.

The beam dividing element has among the plurality of beam dividing areas at least one aberration imparting area that gives an astigmatism or defocus aberration to a beam passing through it. When an astigmatism is applied, the beam dividing area G 027 and the beam dividing area G 197 work as the aberration imparting areas. When a defocus aberration is applied, the beam dividing area H 127 and the beam dividing area I 128 function as the aberration imparting areas.

Further, in the optical head of this embodiment, the light detector produces at least a focus error signal, that monitors a focus shift of the light spot focused on the optical disc, from the beam passing through the aberration imparting area of the beam dividing element.

The light detector also produces a track error signal, that monitors a track shift from a guide groove on the optical disc of a light spot focused on the disc, from the beams passing through the beam dividing areas different from the aberration imparting area. The beam dividing areas A 021, B 022, C 023, D 024, E 025 and F 026 are the ones different from the aberration imparting area.

A playback signal is produced and output by using in combination a beam to generate the track error signal and a beam to generate the focus error signal. This corresponds to the generation and outputting of a playback signal from a beam passing through the aberration imparting area of the beam dividing element and a beam passing through an area of the beam dividing element different from the aberration imparting area, as shown in Equation 4.

In one example arrangement, the aberration imparting area of the beam dividing element is surrounded by non-aberration imparting areas. That is, in the beam dividing element 012, this arrangement corresponds to the beam dividing area G 027 or the aberration imparting area being surrounded by the non-aberration imparting, beam dividing areas A 021, B 022, C 023, D 024, E 025 and F 026. Further, in the beam dividing element 101, the arrangement corresponds to the beam dividing areas H 127 and I 128, or the aberration imparting areas, being surrounded by the non-aberration imparting, beam dividing areas A 021, B 022, C 023, D 024, E 025, F 026.

The aberration imparting areas described above are arranged to include an almost central region of the beam dividing element. More precisely, in the beam dividing elements 012 and 101, the beam dividing area G 027 and the aberration imparting beam dividing areas H 127 and I 128 correspond to the area that includes the almost central region of the beam dividing element.

The aberration imparting area of the beam dividing element is arranged to be surrounded by those of the plurality of beam dividing areas that do not apply aberrations. That is, in the beam dividing elements 012, 101 and 190, the beam dividing areas A 021, B 022, C 023, D 024, E 025, F 026 and the beam dividing areas A 191, B 192, C 193, D 194, E 195, F 196 correspond to the areas that do not apply aberrations.

When the beam dividing element is viewed from the light detector, it is provided with at least seven areas to divide the cross section of a beam reflected from an optical disc into at least seven sections. This construction, in the case of the beam dividing element 012, corresponds to its seven beam dividing areas A021, B 022, C 023, D 024, E 025, F 026, G 027 dividing the beam 028. The light detector receives the seven beams divided by the seven beam dividing areas. Further, the aberration imparting area of the beam dividing element is subdivided into two or more areas with different aberration quantities of astigmatism or defocus aberration. That is, this construction, in the beam dividing element 101 for example, corresponds to the aberration imparting beam dividing area being divided into two areas H 127 and I 128, with the beam dividing area H 127 applying a defocus aberration equivalent to the shorter-than-the-focused-length position to a beam passing through it and the beam dividing area I 128 applying a defocus aberration equivalent to the longer-than-the-focused-length position to a beam passing through it.

Further, each of the plurality of areas of the beam dividing element has diffraction grating grooves and the aberration imparting area is a holographic surface whose diffraction grating grooves are curved to apply a predetermined level of aberration. Alternatively, vectors normal to the individual beam dividing areas are different from one another, with the aberration imparting area formed as a curved surface.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical head comprising;
 a light source to emit a beam;
 an objective to focus the beam on an optical disc;
 a beam dividing element having a plurality of divided areas with which to divide a cross section of the beam reflected from the optical disc; and
 a light detector to receive the beams divided by the beam dividing element, wherein the beam dividing element has in at least one of the plurality of areas an aberration imparting function of imparting an aberration to a beam passing through that area for generating a focus error signal.

2. An optical head according to claim 1, wherein the light detector produces and outputs a focus error signal, that monitors a focus shift of a light spot focused on the optical disc, from a beam passing through the aberration imparting area with the aberration imparting function.

3. An optical head comprising:
 a light source to emit a beam;
 an objective to focus the beam on an optical disc;
 a beam dividing element having a plurality of divided areas with which to divide a cross section of the beam reflected from the optical disc; and
 a light detector to receive the beams divided by the beam dividing element, wherein the beam dividing element has in at least one of the plurality of areas an aberration imparting function of imparting an astigmatism or defocus aberration to a beam passing through that area;
 the light detector produces and outputs a focus error signal, that monitors a focus shift of a light spot focused on the optical disc, from a beam passing through the aberration imparting area with the aberration imparting function; and
 the light detector produces a track error signal, that monitors a track shift between a light spot focused on the optical disc and a guide groove on the optical disc, from a beam passing through one of the plurality of areas different from the aberration imparting area and, by using at least both of the beam for generating the track error signal and the beam for generating the focus error signal, produces and outputs a playback signal.

4. An optical head according to claim 3, wherein the aberration imparting area is surrounded by those of the plurality of areas that do not impart aberrations to beams passing through them.

5. An optical head according to claim 3, wherein the aberration imparting area is an area including an almost central part of the beam dividing element.

6. An optical head according to claim 4, wherein the light detector receives a beam divided into at least seven sections by the beam dividing element.

7. An optical head according to claim 5, wherein the light detector receives a beam divided into at least seven sections by the beam dividing element.

8. An optical head according to claim 6, wherein the aberration imparting area is divided into two or more areas with different aberration quantities of astigmatism or defocus aberration to be imparted to beams passing through them.

9. An optical head according to claim 7, wherein the aberration imparting area is divided into two or more areas with different aberration quantities of astigmatism or defocus aberration to be imparted to beams passing through them.

10. An optical head according to claim 6, wherein each of the plurality of areas of the beam dividing element has diffraction grating grooves and the aberration imparting area is a holographic surface whose diffraction grating grooves are curved to impart a predetermined aberration to a beam passing through it.

11. An optical head according to claim 7, wherein each of the plurality of areas of the beam dividing element has diffraction grating grooves and the aberration imparting area is a holographic surface whose diffraction grating grooves are curved to impart a predetermined aberration to a beam passing through it.

12. An optical head according to claim 6, wherein the beam dividing element has the plurality of its areas so arranged that vectors normal to the individual areas differ from one another and the aberration imparting area is a curved surface.

13. An optical head according to claim 7, wherein the beam dividing element has the plurality of its areas so arranged that vectors normal to the individual areas differ from one another and the aberration imparting area is a curved surface.

* * * * *